(12) United States Patent
Fukui et al.

(10) Patent No.: US 7,141,334 B2
(45) Date of Patent: Nov. 28, 2006

(54) NEGATIVE ELECTRODE FOR LITHIUM SECONDARY BATTERY AND LITHIUM SECONDARY BATTERY

(75) Inventors: Atsushi Fukui, Kobe (JP); Yasuyuki Kusumoto, Kobe (JP); Mariko Torimae, Kobe (JP); Hiroshi Nakamura, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 347 days.

(21) Appl. No.: 10/463,438

(22) Filed: Jun. 18, 2003

(65) Prior Publication Data

US 2003/0235762 A1 Dec. 25, 2003

(30) Foreign Application Priority Data

Jun. 19, 2002 (JP) ............................. 2002-178165

(51) Int. Cl.
*H01M 4/62* (2006.01)
(52) U.S. Cl. .................. 429/217; 429/245; 429/231.95; 429/218.1; 429/232; 429/338
(58) Field of Classification Search ........... 429/231.95, 429/245, 217, 218.1, 232, 338
See application file for complete search history.

(56) References Cited

U.S. PATENT DOCUMENTS 6,946,223 B1 * 9/2005 Kusumoto et al. .......... 429/245

FOREIGN PATENT DOCUMENTS

| JP | 11-339777 | * 12/1999 |
| JP | 11-339777 A | 12/1999 |
| JP | 2000-012088 A | 1/2000 |

* cited by examiner

*Primary Examiner*—Laura Weiner
(74) *Attorney, Agent, or Firm*—Kubovcik & Kubovcik

(57) ABSTRACT

A negative electrode for a lithium secondary battery obtained by providing an active material layer containing particles of an active material and a binder on a surface of a current collector which is an electrically conductive metal foil, and sintering the layer under a non-oxidizing atmosphere; wherein the mean diameter of the particles of the active material is not smaller than 1 μm and not greater than 10 μm, and the particle size distribution of the particles is such that at least 60 volume % of the particles are in a range of not smaller than 1 μm and not greater than 10 μm.

20 Claims, 1 Drawing Sheet

NEGATIVE ELECTRODE FOR LITHIUM SECONDARY BATTERY AND LITHIUM SECONDARY BATTERY

FIELD OF THE INVENTION

The present invention relates to a negative electrode for a lithium secondary battery and a lithium secondary battery including the negative electrode.

BACKGROUND OF THE INVENTION

A lithium secondary battery that comprises a nonaqueous electrolyte and utilizes the transfer of lithium ions between a positive electrode and a negative electrode for charge and discharge of the battery has recently been used as one of new type high output and high energy density batteries.

A negative electrode for a lithium secondary battery in which an active material including silicon is adhered on a current collector having an average roughness of not less than 0.03 μm with a binder has been proposed (Japanese Patent Laid-open NO. 2000-12088).

However, it is known that an active material including silicon increases and decreases its volume when lithium ions are occluded and released, and the active material is pulverized during charge and discharge cycles and separates from the current collector. This causes deterioration of current collecting characteristics (current collectability) and of charge and discharge cycle characteristics.

OBJECT OF THE INVENTION

An object of the present invention is to provide a negative electrode for a lithium secondary battery that is capable of inhibiting deterioration of current collectability to provide excellent charge and discharge characteristics. It is also an object of the present invention to provide a lithium secondary battery having such a negative electrode.

SUMMARY OF THE INVENTION

A negative electrode for a lithium secondary battery of the present invention is obtained by providing an active material layer containing particles of an active material containing silicon and/or a silicon alloy and a binder on a surface of a current collector made of an electrically conductive metal foil, and then sintering the layer under a non-oxidizing atmosphere;

wherein the mean diameter of the particles of the active material is not smaller than 1 μm and not greater than 10 μm, and the particle size distribution is such that at least 60 volume % of the particles are in a range of not smaller than 1 μm and not greater than 10 μm.

[Explanation of elements]

Figure 1:
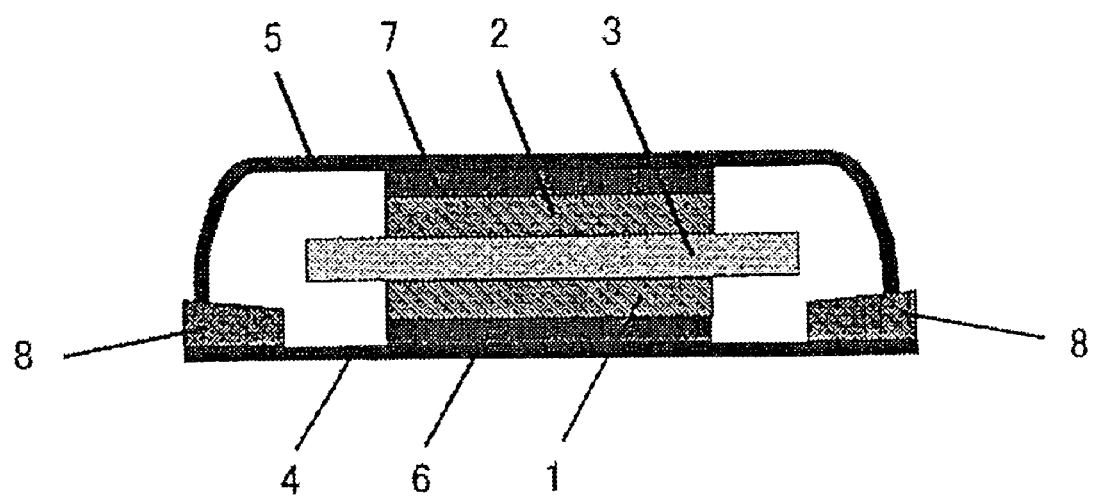
FIG. 1 is a cross section of the batteries prepared in the Experiments.

1: positive electrode
2: negative electrode
3: separator
4: positive electrode can
5: negative electrode can -continued

[Explanation of elements]

6: positive electrode current collector
7: negative electrode current collector
8: insulation packing

DETAILED EXPLANATION OF THE INVENTION

The present invention can inhibit a reduction of current collectability of the negative electrode through the use of particles of an active material having the mean particle diameter and the particle size distribution described above. Although the volume of the particles of the active material increases or decreases during occluding and releasing of lithium ions, the present invention can inhibit an increase in contact resistance between the particles of the active material.

The mean particle diameter of the particles of the active material in the present invention is not smaller than 1 μm and not greater than 10 μm. If the mean diameter of the particles of the active material is smaller than 1 μm, an amount of particles of the active material having a diameter of smaller than 1 μm which do not adhere well to the binder is relatively increased and the binder does not function to decrease the contact resistance between the particles of the active material. This causes a reduction in the current collectability. If the mean diameter of the particles of the active material is greater than 10 μm, an absolute change of volume of the particles of the active material during occluding and releasing of lithium ions becomes large and the binder is destroyed to reduce the current collectability of the electrode.

The particle size distribution in the present invention is sharp such that at least 60 volume % of the particles are in a range of not smaller than 1 μm and not greater than 10 μm. If the particle size distribution is broad such that less than 60 volume % of the particles are in a range of not smaller than 1 μm and not greater than 10 μm, distortion easily occurs in the active material layer, and the binder is easily destroyed to reduce the current collectability of the electrode. The reason for this is that there are big differences in the absolute quantity of volume increase and decrease of the particles of the active materials during occluding and releasing of lithium ions when the particle size is varied.

The mean diameter of the particles of the active material and the particle size distribution can be measured by a particle distribution analyzer using laser diffraction or the like. A particle distribution analyzer using laser diffraction was used in the experiments.

Particles having diameters smaller than 1 μm do not adhere well to the binder as described above and it causes deterioration of current collectability in the electrode. Therefore, in the particle size distribution, particles having a diameter of less than 1 μm are preferably less than 40 volume %.

Oxygen content of the particles of the active material in the present invention is preferably not greater than 0.5 weight %. If the oxygen content is greater than 0.5 weight %, a large amount of lithium oxide is formed during occluding of lithium ions. The lithium oxide hardly releases lithium, and causes an increase of an irreversible capacity at an initial charge and discharge reaction.

The surface of the current collector where the active material layer is provided preferably has a surface roughness (Ra) of at least 0.2 µm. A current collector having such surface roughness can provide a sufficient contact area for the active material layer and the current collector to improve the adhesion of the active material layer and the current collector. A reduction of the current collectability of the electrode can be further inhibited. When the active material layers are provided on both surfaces of the current collector, both surfaces preferably have a surface roughness of at least 0.2 µm.

The surface roughness (Ra) and the average distance (S) between adjacent local peaks preferably satisfy the relationship 100 Ra≧S. The surface roughness (Ra) and the average distance (S) between adjacent local peaks are defined in the Japanese Industrial Standards (JIS B 0601-1994), and can be measured by a surface roughness tester.

A current collector treated to have a roughened surface can be used in the electrode of the present invention. As a method of roughening the surface, plating, vapor deposition, etching, polishing and the like can be illustrated. Plating and vapor deposition are methods for forming an uneven layer on the surface of the current collector. Plating can be electrolytic or non-electrolytic. As vapor deposition, there can be illustrated sputtering, CVD, vapor deposition, and the like. As etching, physical or chemical etching can be used. As polishing, there can be illustrated polishing with sand paper, blasting, and the like.

There are no limitations regarding the current collector if the current collector comprises an electrically conductive metal foil. As examples of the current collector, a conductive metal foil composed of a metal such as copper, nickel, iron, titanium, cobalt and the like, and an alloy containing any combination thereof can be illustrated. The current collector preferably contains a metal element that easily diffuses into the particles of the active material. From this point of view, a metal foil containing copper, especially, a copper metal foil and a copper alloy foil are more preferred. A copper element when heat treated easily diffuses into silicon. When the negative electrode is sintered, adhesion of the current collector and active material layer can be expected to be improved.

It is also possible to use a metal foil having a layer containing copper on a surface as the current collector. That is, a copper or copper alloy layer provided on the surface of a metal foil which does not include copper can be used. The metal foil having a layer containing copper can be prepared by electrolytic plating. Concretely, a nickel foil plated with copper or a copper alloy can be illustrated.

There is no limitation with respect to the thickness of the current collector (Y). However, a thickness of 10~100 µm is preferable. There is no limitation regarding the upper limit of the surface roughness (Ra) of the surface of the current collector. However, the upper limit is preferably not greater than 10 µm because the thickness of the current collector (Y) is preferably in a range of 10~100 µm.

The thickness of the active material layer (X) preferably satisfies relationships with the thickness of the current collector (Y) and the surface roughness (Ra) of the current collector of 5Y≧X, and 250 Ra≧X. If such relationships are satisfied, deformation, for example, wrinkles, and the like, of the current collector can be prevented, and the active material layer can be prevented from peeling from the current collector.

There are no limitations with respect to the thickness of the the active material layer (X). A thickness of not greater than 1000 µm is preferred, and a thickness of 10~100 µm is more preferred. A negative electrode for a lithium secondary battery of the present invention is obtained by sintering under a non-oxidizing atmosphere after the active material layer is provided on the surface of the current collector. Sintering under a non-oxidizing atmosphere can be performed under, for example, a nitrogen atmosphere, an inactive gas atmosphere, for example, argon and the like, or the like. It is also possible to perform the sintering under a reduction atmosphere, for example, a hydrogen atmosphere, or the like. The temperature used for the sintering is preferably lower than the melting point of the current collector and of the particles of the active material. For example, when a copper foil is used as the current collector, it is preferred that the sintering temperature is not greater than the melting point of copper, i.e., 1083° C. The temperature used for sintering is preferably in a range of 200~500° C., and more preferably, in a range of 300~450° C. As a method of sintering, spark plasma sintering, hot pressing, or the like, can be used.

In the present invention, preferably after the active material layer is provided on the current collector, the active material layer with the underlying current collector is subject to rolling, prior to sintering. Rolling can increase a packing density in the active material layer and adhesion between particles of the active material and between the active material and the current collector to improve charge and discharge cycle characteristics.

The binder used in the present invention preferably does not completely decompose after the heat treatment for sintering. If the binder remains after the heat treatment and is not decomposed, the binding ability of the binder increases adhesion between particles of the active material and between the active material and the current collector, as well as sintering. If an electrically conductive metal foil having a surface roughness (Ra) of at least 0.2 µm is used as the current collector, the binder penetrates into the uneven surface of the current collector, and an anchor effect occurs between the binder and the current collector to increase the adhesion. Even if the volume of the particles of the active material increases or decreases during occluding and releasing of lithium ions, peeling of the active material layer from the current collector can be prevented and excellent charge and discharge cycle characteristics can be obtained.

As the binder, polyimide is preferred. Thermoplastic and thermosetting polyimides can be illustrated as the polyimide. Polyimide can be obtained by heat treatment of polyamic acid.

Polyimide is obtained by heat treatment of polyamic acid by dehydration condensation to form polyimide. A yield of imide of the polyimide is preferably at least 80%. The yield of imide means the mol % of the produced polyimide to the polyimide precursor (polyamic acid). Polyimide having an imide yield of at least 80% can be obtained when polyamic acid in N-methylpyrrolidone (NMP) is heated at 100~400° C. for not less than one hour. If the temperature is 350° C., the imide yield is 80% for about a one hour heat treatment, and is 100% for about a three hour heat treatment.

It is preferred in this invention that the binder is not completely decomposed after heat treatment for sintering. Therefore, if polyimide is used as the binder, it is preferred that the heat treatment for sintering is done at a temperature of not greater than 600° C.

An amount of the binder in the active material layer is preferably at least 5% based on the total weight of the active material layer. A volume of the binder is preferably at least 5% of the total volume of the active material layer. If the amount of the binder in the active material layer is too little, the binder may not be able to provide sufficient adhesion in the electrode. If the amount of the binder in the active material layer is excessive, resistance in the electrode increases to make the initial charge difficult. Therefore, the amount of the binder in the active material layer is preferably not greater than 50 weight % of the total weight of the layer, and the volume of the binder in the active material layer is preferably not greater than 50% of the total volume of the layer.

An electrically conductive powder can be mixed in the active material layer. If an electrically conductive powder is mixed in the layer, an electrically conductive network is formed around the particles of the active material to increase current collectability of the electrode. As the electrically conductive powder, materials similar to the electrically conductive metal foil can preferably be used. Concretely, copper, nickel, iron, titanium, cobalt and the like, and an alloy or a mixture of these elements can preferably be used alone or in combination thereof. Copper powder is preferable as a metal powder. An electrically conductive carbon powder can also preferably be used.

An amount of the electrically conductive powder is preferably not greater than 50 weight % of the total weight of the electrically conductive powder and the particles of the active material. If an amount of the electrically conductive powder is excessive, the ratio of the particles of the active material becomes relatively low, and charge and discharge capacity of the electrode is reduced.

As the particles of the active material, particles of silicon and/or silicon alloy can be illustrated. As the silicon alloy, a solid solution of silicon and at least one additional element, an intermetallic compound of silicon and at least one additional element, an eutectic alloy of silicon and at least one additional element, and the like can be illustrated. The alloy can be prepared by arc melting, liquid quenching, mechanical alloying, sputtering, chemical vapor deposition, calcining, or the like. As liquid quench, single roll quenching, double roll quenching, atomizing, for example, gas atomizing, water atomizing, disc atomizing, and the like, can be illustrated.

As the particles of the active material, silicon and/or silicon alloy particles coated with a metal or the other can be used. The particles can be coated by electroless plating, electrolytic plating, chemical reduction, vapor deposition, sputtering, chemical vapor deposition, or the like. As the metal used to coat the surface of the particles, it is preferred to use the same metal as used for the electrically conductive metal foil. If the particles are coated with the same metal as the metal foil, the degree of bonding with the current collector dramatically improves, and excellent charge and discharge cycle characteristics can be obtained.

The particles of the active material may include particles comprising a material which forms an alloy with lithium. As such material, germanium, tin, lead, zinc, magnesium, sodium, aluminum, gallium, indium, and an alloy thereof can be illustrated.

The lithium secondary battery of the present invention contains the negative electrode described above, a positive electrode containing a positive electrode active material and a non-aqueous electrolyte. The non-aqueous electrolyte preferably contains vinylene carbonate as a component of the solvent. If vinylene carbonate is contained in the non-aqueous electrolyte, a coating which is excellent in lithium ion conductivity is formed on the surface of the particles of the active material by charge and discharge reactions. When such coating is formed, a path is provided which is capable of conducting lithium ions through the active material layer as the charge and discharge reaction progresses. This makes charge/discharge reactions possible in the entire active material layer to improve charge and discharge cycle characteristics. The particles of the active material have a mean diameter of not smaller than 1 μm and not greater than 10 μm, and the particle size distribution is such that at least 60 volume % of the particles are in a range of not smaller than 1 μm and not greater than 10 μm. Therefore, the particles have good contact with each other in the active material layer. When a coating of vinylene carbonate is formed on the surface of the particles, paths closely intertwined to conduct lithium ions are created in the active material layer. Therefore, the entire active material layer can be used for charge and discharge reactions to improve the charge and discharge characteristics.

The amount of vinylene carbonate used is preferably at least 0.1 weight % on the basis of the total weight of the solvent, and more preferably, in a range of 0.5~10 weight %. If the amount of vinylene carbonate is not sufficient, the effect of forming a coating having excellent conductivity of lithium ions on the particles of the active material may not be sufficiently obtained.

There is no limitation with respect to the solvent to be used for the nonaqueous electrolyte. Cyclic carbonates, for example, ethylene carbonate, propylene carbonate, butylene carbonate, and the like; chain carbonates, for example, dimethyl carbonate, methylethyl carbonate, diethyl carbonate, and the like can be used alone or in combinations thereof. A mixture of the cyclic carbonate described above and an ether, for example, 1,4-dioxane, 1,2-dimethoxyethane, 1,2-diethoxyethane, and the like, can also be used.

As a solute to be dissolved in the nonaqueous electrolyte, $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, and the like, can be used alone or in various combinations thereof. A mixture of $LiXF_y$ (where X is P, As, Sb, B, Bi, Al, Ga or In; when X is P, As or Sb, y is 6; and when X is Bi, Al, Ga or In, y is 4) and lithium perfluoroalkylsulfonylimide, $LiN$ $(C_mF_{2m+1}SO_2)$ $(C_nF_{2n+1}SO_2)$ (where m and n are each independently an integer of 1~4), or lithium perfluoroalkylsulfonylmethide, $LiC$ $(C_pF_{2p+1}SO_2)$ $(C_qF_{2q+1}SO_2)$ $(C_rF_{2r+1}SO_2)$ (where p, q and r are each independently an integer of 1~4) can preferably be used. Especially, a mixture of $LiPF_6$ and $LiN(C_2F_5SO_2)_2$ is preferred.

As the electrolyte, a gel polymer electrolyte in which the electrolyte is impregnated in a polymer, for example, polyethylene oxide, polyacrylonitrile, and the like, and an inorganic solid electrolyte, for example, $LiI$, $Li_3N$, and the like, can also be used. There is no limitation regarding the electrolyte for the present invention as long as the lithium compound as the solute which provides ion conductivity and the solvent in which the lithium compound is dissolved do not decompose during discharge, charge or storage of the battery.

As the positive electrode active material for the lithium secondary battery, lithium-containing transition metal oxides, for example, $LiCoO_2$, $LiNiO_2$, $LiMn_2O_4$, $LiMnO_2$, $LiCo_{0.5}Ni_{0.5}O_2$, $LiNi_{0.7}Co_{0.2}Mn_{0.1}O_2$, and the like, and metal oxides not containing lithium, for example, $MnO_2$, and the like, can be illustrated. In addition to the materials described above, if the material is electrochemically capable of occluding and releasing lithium, the material for the positive electrode is not limited.

DESCRIPTION OF PREFERRED EMBODIMENT

Embodiments of the present invention are explained in detail below. It is of course understood that the present invention is not limited to these embodiments and can be modified within the spirit and scope of the appended claims.

(Experiment 1)

[Preparation of Negative Electrode]

80.2 weight parts of silicon powder (active material a1) having a mean diameter of 2.4 μm and an oxygen content and particle size distribution shown in Table 1 was added to 8.6 weight % of N-methylpyrrolidone solution containing 19.8 weight parts of polyamic acid as a binder to prepare a negative electrode slurry mixture.

The slurry was coated on one surface of an electrolytic copper foil (thickness: 35 μm) having a surface roughness (Ra) of 0.5 μm which is a current collector, and was rolled after drying. A disc having a diameter of 20 mm was cut out from the coated copper foil, and was sintered by heating at 400° C. for 30 hours under an argon atmosphere to prepare a negative electrode. The thickness of the electrode (including the current collector) was 50 μm. Therefore, the thickness of the active material layer was 15 μm. Thickness of the active material layer (X)/surface roughness of the copper foil (Ra) was 30. Thickness of the active material layer (X)/thickness of the copper foil (Y) was 0.43.

Polyimide was formed from polyamic acid by heat treatment of the negative electrode. Polyimide in the active material layer including the binder, was 18.2 weight %. Density of the polyimide was 1.1 g/cm$^3$, and the volume of polyimide was 31.8% based on the total volume of the active material layer including polyimide.

TABLE 1

| Active Material | Oxygen Content (w %) | Mean Diameter of Particles (μm) | Particle Size Distribution (v %) | | |
|---|---|---|---|---|---|
| | | | <1 μm | ≧1 μm ≦10 μm | 10 μm< |
| a1 | 0.2 | 2.4 | 24 | 75 | 1 |

The oxygen content was measured by an oxygen analyzer (LECO, RO-416DR).

[Preparation of Positive Electrode]

Li$_2$CO$_3$ and CoCO$_3$ were measured to an atomic ratio of 1:1 and were mixed in a mortar. The mixture was pressed in a mold having a diameter of 17 mm, and was sintered at 800° C. for 24 hours in air to obtain a sintered LiCoO$_2$. It was ground in a mortar to particles having a mean diameter of 20 μm.

90 parts by weight of the LiCoO$_2$ powder and 5 parts by weight of artificial carbon powder as a electrically conductive agent were mixed with 5 weight % of N-methylpyrrolidone solution containing 5 parts by weight of polyfluorovinylidene as a binder to prepare a positive electrode mixture slurry.

The slurry was coated on aluminum foil which was a current collector, and was rolled after drying. A disc having a diameter of 20 mm was cut out from the coated aluminum foil to prepare a positive electrode.

[Preparation of Electrolyte]

1 mol/l LiPF$_6$ was dissolved in an equal volume mixture (1:1) of ethylene carbonate and diethylene carbonate to prepare an electrolyte.

[Preparation of Battery]

A flat (coin) shape lithium secondary battery (A1) was prepared using the positive electrode, negative electrode and electrolyte prepared above.

The battery as shown in FIG. 1 comprises positive electrode 1, negative electrode 2, separator 3, positive electrode can 4, negative electrode can 5, positive electrode current collector 6, negative electrode current collector 7 and insulation packing 8 comprising polypropylene.

The positive electrode 1 and the negative electrode 2 are made to face each other through the separator 3. They are housed in a battery case comprising the positive electrode can 4 and the negative electrode can 5. The positive electrode 1 is connected to the positive electrode can 4 through the positive electrode current collector 6, and the negative electrode 2 is connected to the negative electrode can 5 through the negative electrode current collector 7 to provide a structure capable of being charged and discharged as a secondary battery.

(Experiment 2)

Batteries A2 and B1~B3 were prepared in the same manner as Experiment 1 except that active materials a2 and b1~b3, respectively, having the mean particle diameters, oxygen contents and particle size distributions shown in Table 2 were used instead of the active material a1.

TABLE 2

| Active Material | Oxygen Content (w %) | Mean Diameter of Particles (μm) | Particle Size Distribution (v %) | | |
|---|---|---|---|---|---|
| | | | <1 μm | ≧1 μm ≦10 μm | 10 μm< |
| a2 | 0.2 | 2.0 | 32 | 68 | 0 |
| b1 | 0.2 | 1.2 | 43 | 57 | 0 |
| b2 | 0.2 | 0.9 | 54 | 46 | 0 |
| b3 | 0.2 | 12 | 8 | 49 | 43 |

[Evaluation of Charge and Discharge Cycle Characteristics]

Charge and discharge cycle characteristics of batteries A1, A2 and B1~B3 were evaluated. Each battery was charged to 4.2 V at a constant current of 1 mA and 25° C., and then was discharged to 2.7 V at a constant current of 1 mA and 25° C. (this is considered to be one charge and discharge cycle). The number of cycles to reach 80% of the discharge capacity of the first cycle was measured to determine a cycle life of the battery. The results are shown in Table 3. The cycle life of each battery is shown as an index when the cycle life of the battery A1 is 100.

TABLE 3

| Battery | Active Material | Life |
|---|---|---|
| A1 | a1 | 100 |
| A2 | a2 | 81 |
| B1 | b1 | 21 |
| B2 | b2 | 15 |
| B3 | b3 | 34 |

As is clear from the results shown in Table 3, batteries A1 and A2 in which the particles of the active material, a1 and a2, have mean diameters of not smaller than 1 μm and not greater than 10 μm, and the particle size distributions are such that at least 60 volume % of the particles are in a range of not smaller than 1 μm and not greater than 10 μm, have longer lives compared to the batteries B1, B2 and B3 prepared from the active materials b1, b2 and b3, respectively, in which the particles do not have these mean diameters and do not have particle size distributions in this range. It is believed that using the particles having the above mean diameters and particle size distributions in the above range, a reduction in the current collectability of the electrode which occurs by an increase of contact resistance between the particles when volumes of the particles expand or shrink during occluding and releasing of lithium ions when the batteries are charged and discharged, was successfully inhibited.

Especially, the batteries B1 and B2 prepared by the active materials b1 and b2, having particle size distributions in which at least 40 volume % of the particles are smaller than 1 μm, have short cycle lives, i.e., cycle characteristics are not good. It is believed that the particles having particle size distributions in which at least 40 volume % of the particles are smaller than 1 μm did not adhere well to the binder, the binder could not contribute to a reduction of the contact resistance between the particles of the active material, and current collectability of the electrode wss reduced.

(Experiment 3)

The effect of oxygen content of silicon powder as the active material on irreversible capacity at initial charge and discharge was examined.

Battery A3 was prepared in the same manner as Experiment 1 except that active material a3 having the mean particle diameter, oxygen content and particle size distribution shown in Table 4, was used instead of the active material a1.

TABLE 4

| Active Material | Oxygen Content (w %) | Mean Diameter of Particles (μm) | Particle Size Distribution (v %) | | |
|---|---|---|---|---|---|
| | | | <1 μm | ≧1 μm ≦10 μm | 10 μm< |
| a3 | 0.6 | 2.4 | 24 | 75 | 1 |

Cycle characteristics of battery A3 were evaluated in the same manner as described above. Cycle life is also shown when the cycle life of battery A1 is taken as 100. Charge-discharge efficiency of the first cycle of each of batteries A1 and A3 was also evaluated.

The efficiency was calculated as follows:

Efficiency of the first cycle (%)=(discharge capacity of the first cycle/charge capacity of the first cycle)×100

Each battery's efficiency is described as an index when the efficiency of battery A1 is taken as 100. The results are shown in Table 5.

TABLE 5

| Battery | Active Material | Oxygen Content (w %) | Efficiency | Life |
|---|---|---|---|---|
| A1 | a1 | 0.2 | 100 | 100 |
| A3 | a3 | 0.6 | 92 | 98 |

As is clear from the results shown in Table 5, battery A1 prepared using active material particles having an oxygen content of not greater than 0.5 weight % has a higher charge-discharge efficiency than battery A3 prepared using active material particles having an oxygen content of greater than 0.5 weight %. It is believed that if the oxygen content of the silicon powder is greater than 0.5 weight %, an oxide layer is significantly formed on the surface of the active material, and lithium oxide, which hardly releases lithium ion and causes nonreversible capacity during charge and discharge reactions, was significantly formed during occluding of lithium ions.

(Experiment 4)

The effect of surface roughness (Ra) of the current collector was evaluated.

Batteries A4 and A5 were prepared in the same manner as Experiment 1 except that an electrolytic copper foil having a surface roughness (Ra) of 0.2 μm and 0.17 μm, respectively, was used instead of the electrolytic copper foil having a surface roughness (Ra) of 0.5 μm.

Cycle characteristics of batteries A4 and A5 were evaluated in the same manner described above. Cycle life is described as an index when the cycle life of battery A1 is taken as 100. Table 6 also includes the cycle life of battery A1.

TABLE 6

| Battery | Surface Roughness (μm) | Life |
|---|---|---|
| A1 | 0.5 | 100 |
| A4 | 0.2 | 78 |
| A5 | 0.17 | 52 |

As is clear from the results shown in Table 6, batteries A1 and A4 prepared using a current collector having a surface roughness (Ra) of at least 0.2 μm have excellent cycle characteristics as compared to battery A5 prepared using a current collector having a surface roughness (Ra) of smaller than 0.2 μm. It is believed that contact area of the particles of the active material and the surface of the current collector is increased by using the metal foil having a surface roughness (Ra) of at least 0.2 μm, and sintering effectively increases adhesion of the particles of the active material and the current collector, and the binder penetrates into uneven portions of the surface of the current collector, and the adhesion increases because of an anchor effect occurring in the binder and the current collector to increase current collectability of the electrode.

(Experiment 5)

The effect of different kinds of binders on cycle characteristics was evaluated. Battery A6 was prepared in the same manner as Experiment 1 except that polyfluorovinylidene (PVdF) was used instead of polyimide.

Cycle characteristics of battery A6 were evaluated in the same manner described above. Cycle life is described as an index when the cycle life of battery A1 is taken as 100. Table 7 also includes the cycle life of battery A1. Binder decomposition starting temperature is a temperature at which the weight of the binder starts to decrease by thermogravimetric analysis of the binder.

TABLE 7

| Battery | Binder | Decomposition Starting Temperature (° C.) | Life |
|---|---|---|---|
| A1 | Polyimide | 500 | 100 |
| A6 | Polyfluorovinylidene | 380 | 77 |

As shown in Table 7, battery A1 prepared using the binder having a high decomposition starting temperature has better cycle characteristics than battery A6 using a binder having a lower decomposition starting temperature than the temperature for heat treatment of the electrode, 400° C. It is believed that the binder was not completely decomposed after the heat treatment, and the remaining non-decomposed binder reinforced adhesion in addition to the adhesion improved by sintering between the particles of the active material and the current collector and of the particles of the active material to each other to provide the electrode with excellent adhesion.

(Experiment 6)

The effect of sintering conditions of the electrodes on cycle characteristics was evaluated. Battery A7 was prepared in the same manner as Experiment 1 except that the electrode was treated at 700° C. for ten hours. Battery B4 was prepared in the same manner as Experiment 1 except that the electrode was not treated by heat.

Cycle characteristics of batteries A7 and B4 were evaluated in the same manner as described above. Cycle life is described as an index when the cycle life of battery A1 is taken as 100. Table 8 also includes the cycle life of battery A1.

TABLE 8

| Battery | Heat Treatment Condition | Life |
|---|---|---|
| A1 | 400° C., 30 hours | 100 |
| A7 | 700° C., 10 hours | 53 |
| B4 | None | 19 |

As is clear from the results shown in Table 8, battery A1 had excellent cycle characteristics as compared to battery B4 prepared without heat treatment of the electrode. It is believed that the particles of the active material and the current collector were sintered by heat treatment, and adhesion of the active material layer and current collector increased to improve the current collectability of the electrode.

Battery A7 in which the electrode is treated at 700° C. for ten hours reduced the cycle characteristics as compared to battery A1 in which the electrode is treated at 400° C. for 30 hours. It appears that the binder was decomposed by the heat treatment at 700° C., and adhesion resulting from the binder in the electrode was significantly reduced to decrease the current collectability.

(Experiment 7)

The effect of an electrically conductive powder added to the active material layer was evaluated.

Battery A8 was prepared in the same manner as Experiment 1 except that 20 weight % (based on the weight of the silver powder and the silicon powder) silver powder of a mean diameter of 3 μm was added to the silicon powder. Cycle characteristics of battery A8 were evaluated in the same manner as described above. Cycle life is described as an index when the cycle life of battery A1 is taken as 100. Table 9 also includes the cycle life of battery A1.

TABLE 9

| Battery | Electrically Conductive Powder | Life |
|---|---|---|
| A1 | None | 100 |
| A8 | Silver Powder | 103 |

As is clear from the results shown in Table 9, battery A8 in which silver powder is added to the active material had better cycle characteristics than battery A1 which did not include electrically conductive powder in the active material. The electrically conductive powder is believed to have formed a network around the particles of active material to improve the current collectability in the active material layer.

(Experiment 8)

A negative electrode was prepared in the same manner as Experiment 1 except that silicon powder (active material a4) was used as particles of active material having a mean diameter of 3 μm, and the oxygen content and particle size distribution shown in Table 10.

TABLE 10

| Active Material | Oxygen Content (w %) | Mean Diameter of Particles (μm) | Particle Size Distribution (v %) | | |
|---|---|---|---|---|---|
| | | | <1 μm | ≧1 μm ≦10 μm | 10 μm< |
| a4 | 0.2 | 3 | 14 | 81 | 5 |

Battery A9 was prepared in the same manner as Experiment 1 except that the negative electrode prepared above and an electrolyte containing 1 mol/l LIPF$_6$ dissolved in 3:7 volume parts of a mixture of ethylene carbonate and diethylene carbonate and 5 weight % (based on the total weight of the mixture of ethylene carbonate, diethylene carbonate and vinylene carbonate) vinylene carbonate were used.

Batteries A10, A11, A12 and A13 were prepared in the same manner as battery A9 except that 2.5, 0.5, 0.2 and 0 weight % (based on the total weight of solvent), respectively, of vinylene carbonate was added to 1 mol/l LiPF$_6$ dissolved in 3:7 volume parts of a mixture of ethylene carbonate and diethylene carbonate.

Cycle characteristics of the batteries prepared above were evaluated in the same manner as described above. Cycle life is described as an index when the cycle life of battery A9 is taken as 100.

TABLE 11

| Battery | Content of Vinylene Carbonate (w %) | Life |
|---|---|---|
| A9 | 5 | 100 |
| A10 | 2.5 | 98 |
| A11 | 0.5 | 87 |
| A12 | 0.2 | 74 |
| A13 | 0 | 51 |

As is clear from the results shown in Table 11, batteries containing vinylene carbonate in the electrolyte had a longer cycle life as compared to the battery A13 which did not contain vinylene carbonate in the electrolyte. It is believed that a coating which has excellent conductivity of lithium ions is formed on the surface of the particles of the active material when the electrolyte contains vinylene carbonate to make it possible to have charge and discharge reactions in the entire active material layer.

ADVANTAGES OF THE INVENTION

The present invention can inhibit deterioration of current collectability in a battery, and charge-discharge cycle characteristics can be improved.

What is claimed is:

1. A negative electrode for a lithium secondary battery comprising a negative electrode obtained by providing an active material layer containing particles of an active material containing at least one of silicon and a silicon alloy and a polyimide binder on a surface of a current collector comprising an electrically conductive metal foil, and sintering the layer under a non-oxidizing atmosphere;
   wherein the mean particle diameter of the particles of the active material is not smaller than 1 μm and not greater than 10 μm, and the particle size distribution is such that at least 60 volume % of the particles are in a range of not smaller than 1 μm and not greater than 10 μm.

2. The negative electrode for a lithium secondary battery according to claim 1, wherein oxygen content of the particles of the active material is not greater than 0.5 weight %.

3. The negative electrode for a lithium secondary battery according to claim 1, wherein the particle size distribution is such that less than 40 volume % of the particles have a diameter of less than 1 μm.

4. The negative electrode for a lithium secondary battery according to claim 1, wherein the particles of the active material are silicon particles.

5. The negative electrode for a lithium secondary battery according to claim 1, wherein surface roughness (Ra) of the current collector on which the active layer is provided is at least 0.2 μm.

6. The negative electrode for a lithium secondary battery according to claim 1, wherein the current collector is selected from the group consisting of a copper foil, a copper alloy foil, and a metal foil having a layer of a copper or copper alloy on its surface.

7. The negative electrode for a lithium secondary battery according to claim 1, wherein the current collector is selected from the group consisting of an electrolytic copper foil, an electrolytic copper alloy foil, and a metal foil having a layer of electrolytic copper or electrolytic copper alloy on its surface.

8. The negative electrode for a lithium secondary battery according to claim 1, wherein the polyimide binder remains in the active material layer after sintering.

9. The negative electrode for a lithium secondary battery according to claim 1, wherein the active material layer further contains an electrically conductive powder.

10. A lithium secondary battery comprising a negative electrode, a positive electrode comprising a positive electrode active material and a nonaqueous electrolyte, wherein the negative electrode is obtained by providing an active material layer containing particles of an active material containing at least one of silicon and a silicon alloy and a polyimide binder on a surface of a current collector comprising an electrically conductive metal foil, and sintering the layer under a non-oxidizing atmosphere;
   and wherein the mean particle diameter of the particles of the active material is not smaller than 1 μm and not greater than 10 μm, and the particle size distribution is such that at least 60 volume % of the particles are in a range of not smaller than 1 μm and not greater than 10 μm.

11. The lithium secondary battery according to claim 10, wherein oxygen content of the particles of the active material is not greater than 0.5 weight %.

12. The lithium secondary battery according to claim 10, wherein the particle size distribution is such that less than 40 volume % of the particles have a diameter of less than 1 μm.

13. The lithium secondary battery according to claim 10, wherein the particles of the active material are silicon particles.

14. The lithium secondary battery according to claim 10, wherein surface roughness (Ra) of the current collector on which the active layer is provided is at least 0.2 μm.

15. The lithium secondary battery according to claim 10, wherein the current collector is selected from the group consisting of a copper foil, a copper alloy foil, and a metal foil having a layer of a copper or copper alloy on its surface.

16. The lithium secondary battery according to claim 10, wherein the current collector is selected from the group consisting of an electrolytic copper foil, an electrolytic copper alloy foil, and a metal foil having a layer of electrolytic copper or electrolytic copper alloy on its surface.

17. The lithium secondary battery according to claim 10, wherein the polyimide binder remains in the active material layer after sintering.

18. The lithium secondary battery according to claim 10, wherein the active material layer further contains an electrically conductive powder.

19. The lithium secondary battery according to claim 10, wherein a solvent for the nonaqueous electrolyte contains vinylene carbonate.

20. A lithium secondary battery comprising a negative electrode, a positive electrode comprising a positive electrode active material and a nonaqueous electrolyte, wherein the negative electrode is obtained by providing an active material layer containing particles of an active material containing at least one of silicon and a silicon alloy and a polyimide bimder on a surface of a current collector comprising an electrically conductive metal foil, and sintering the layer under a non-oxidizing atmosphere;
   wherein the mean particle diameter of the particles of the active material is not smaller than 1 μm and not greater than 10 μm, and the particle size distribution is such that at least 60 volume % of the particles are in a range of not smaller than 1 μm and not greater than 10 μm; and
   wherein the nonaqueous electrolyte contains not less than 0.1 weight % vinylene carbonate in the solvent.

* * * * *